(12) United States Patent
Correa et al.

(10) Patent No.: US 11,276,104 B1
(45) Date of Patent: Mar. 15, 2022

(54) ONLINE RECOMMENDATIONS

(71) Applicant: salesforce.com, inc., San Francisco, CA (US)

(72) Inventors: Joshua Correa, Arlington, MA (US); Alexander Kushkuley, Ashland, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/999,845

(22) Filed: Aug. 21, 2020

(51) Int. Cl.
*G06Q 30/06* (2012.01)
*G06N 7/00* (2006.01)
*G06Q 30/02* (2012.01)

(52) U.S. Cl.
CPC ......... *G06Q 30/0631* (2013.01); *G06N 7/005* (2013.01); *G06Q 30/0282* (2013.01); *G06Q 30/0633* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 8,117,085 B1 * | 2/2012 | Smith | G06Q 30/0641 705/26.7 |
| 10,762,548 B1 | 9/2020 | Krishnan et al. | |
| 10,789,293 B2 | 9/2020 | Kushkuley et al. | |
| 2012/0284079 A1 | 11/2012 | Vakhutinsky et al. | |
| 2013/0211878 A1 | 8/2013 | Kushkuley et al. | |
| 2019/0311301 A1 * | 10/2019 | Pyati | G06F 16/901 |

\* cited by examiner

*Primary Examiner* — Ming Shui
(74) *Attorney, Agent, or Firm* — Butzel Long (57) ABSTRACT

A group of recommendations related to an item, such as an item of content presented to a user in a page, can be ranked according to a probability distribution that is iteratively updated with each user interaction. For practical implementations, a click stream of interactions may be logged, and then applied in a batch process to update the probability distribution on any suitable schedule independent of the timing of incoming user interactions.

19 Claims, 7 Drawing Sheets

ONLINE RECOMMENDATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to the online recommendations, and more specifically to the use of a periodically updated probability distribution to rank a group of online recommendations in response to user interactions.

BACKGROUND

Typical online recommendation systems rely on objective similarity measures to select potential items of interest. However, existing techniques can be computationally expensive, and may require complex and/or time-dependent rules to maintain relevance of recommendations to a particular user. There remains a need for techniques to rank online recommendations that avoid time-dependent logic and computationally demanding pair-wise similarity calculations.

SUMMARY

A group of recommendations related to an item, such as an item of content presented to a user in a page, can be ranked according to a probability distribution that is iteratively updated with each user interaction. For practical implementations, a click stream of interactions may be logged, and then applied in a batch process to update the probability distribution on any suitable schedule independent of the timing of incoming user interactions.

In one aspect, there is disclosed herein a method for revising a ranked list of recommendations comprising: generating a plurality of recommended items related to an item; characterizing the plurality of recommended items with a probability distribution that includes, for each of the plurality of recommended items, a probability of being selected by a user viewing the item; ranking the plurality of recommended items according to the probability distribution; displaying the plurality of recommended items in a page according to the ranking; receiving an interaction with a first item of the plurality of recommended items; and in response to the interaction, adjusting the probability of being selected for each of the plurality of recommended items in the probability distribution by increasing the probability of being selected for the first item of the plurality of recommended items according to a ranking parameter and decreasing the probability of being selected for at least a second item of the plurality of recommended items proportionally according to the ranking parameter.

Adjusting the probability of being selected for each of the plurality of recommended items in the probability distribution may include increasing the probability of being selected for the first item of the plurality of recommended items according to a ranking parameter and decreasing the probability of being selected for at least a second item of the plurality of recommended items according to the ranking parameter. Decreasing the probability of being selected for each other one of the plurality of recommended items may include multiplying the probability of being selected for each other one of the plurality of recommended items by the ranking parameter. Increasing the probability of being selected for the one of the plurality of recommended items includes multiplying the probability of being selected for the one of the plurality of recommended items by a function of the ranking parameter that causes a sum of probabilities in the probability distribution to equal one. The ranking parameter may have a value between zero and one, or the ranking parameter may have a value between nine tenths and one.

The method may include dynamically adjusting the ranking parameter to reduce the probability of any of the plurality of recommended items that remains unselected over a predetermined interval by a predetermined amount based on an average per-item click rate for historical activity. The interaction may include a selection of the one of the plurality of recommended items in the page. The interaction may include an addition of the one of the plurality of recommended items to an online shopping cart. The interaction may include a check-out for an online shopping cart containing the one of the plurality of recommended items. The recommended items may include at least one product, service, multimedia object, or learning resource related to content within the page. The method may include removing a first one of the recommended items when the first one of the recommended items has a first probability of being selected less than a predetermined threshold. The method may include adding a third recommended item to the recommended items when the plurality of recommended items is fewer than a predetermined threshold. The third recommended item may be ranked at a bottom of the plurality of recommended items. In another aspect, the third recommended item may be ranked within the probability distribution using a ranking parameter that maximizes a mixture entropy of a convex mixture of a first distribution corresponding to the probability distribution padded with a zero and a second distribution containing a one padded with a zero for each value in the probability distribution.

The method may include presenting the item for viewing in the page along with one or more of the plurality of recommended items. Adjusting the probability of being selected for each of the plurality of recommended items in the probability distribution may include updating the probability distribution at periodic intervals on a batch basis by sequentially recalculating the probability distribution for each of a group of selection activities accumulated in an event log. The method may include, in response to the interaction, adjusting one or more other probability distributions for one or more other recommended items related to one or more other pages. The method may include adjusting the probability distribution for each of a plurality of different types of interactions using a type-specific ranking parameter for two or more of a selection, an addition to an online shopping cart, and a check out for the online shopping cart.

In another aspect, a computer program product for revising a ranked list of recommendations disclosed herein includes non-transitory computer executable code embodied in a computer readable medium that, when executing on one or more computing devices, performs the steps of: generating a plurality of recommended items related to an item; characterizing the plurality of recommended items with a probability distribution that includes, for each of the plurality of recommended items, a probability of being selected by a user; ranking the plurality of recommended items according to the probability distribution; displaying the plurality of recommended items in a page according to the ranking; receiving an interaction with a first item of the plurality of recommended items; and in response to the interaction, adjusting the probability of being selected for each of the plurality of recommended items in the probability distribution by increasing the probability of being selected for the first item of the plurality of recommended items and decreasing the probability of being selected for at least a second item of the plurality of recommended items.

In another aspect, a system disclosed herein includes a server, a database, and a ranking engine. The server may be configured to present web content. The database may store content including an item for presentation by the server in a page, a plurality of recommended items related to the item, and a probability distribution that includes, for each of the plurality of recommended items, a probability of being selected by a user viewing the item. The ranking engine may be configured to receive an interaction by a user with one of the plurality of recommended items within the page and, in response to the interaction, to adjust the probability of being selected for each of the plurality of recommended items in the probability distribution by increasing the probability of being selected for the one of the plurality of recommended items and to decrease the probability of being selected for each other one of the plurality of recommended items to adjust a sum of the probability of being selected for all of the recommended items in the probability distribution to one, wherein the server is configured to present a list of the plurality of recommended items in an order ranked according to the probability distribution.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, for example, the term "or" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Figure 1:
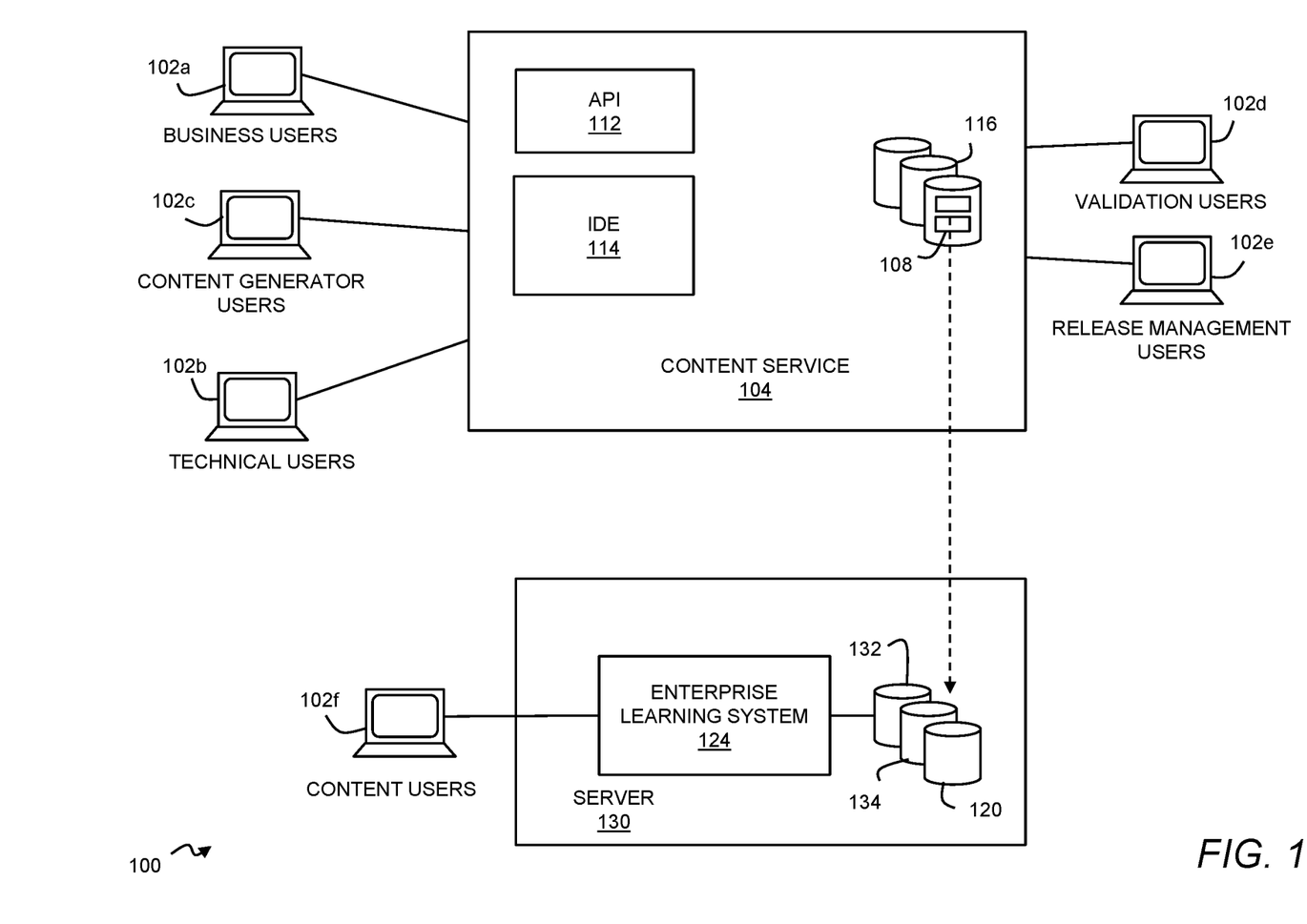
FIG. 1 shows a content publication platform.

FIG. 1 shows a content management platform. The system 100 may include a variety of different hardware and/or software components in communication with each other. The system 100 may include a number of users 102a-102f and a content service 104 with an application programming interface ("API") 112, an integrated development environment 114, and a content service database 116 storing data including objects 108 such as learning resources, goods and services available for purchase, informational content, and other content developed with the content service 104 for publication over a network. The system 100 may also include an enterprise learning system 124 using a production database 120 of content based on the content service database 116.

Users 102a-102f can include a variety of users associated with a variety of roles and/or permissions. Examples of users may include at least one business user 102a, at least one technical user 102b, at least one content generator user 102c, at least one validation user 102d, and at least one release management user 102e, who may all participate in the creation, review, release and administration of content. In one aspect, content includes learning resources such as educational content for the enterprise learning system. The users may also include at least one content user 102f who uses the learning content from the production database 120 through the enterprise learning system 124, or who uses any other items of content stored in the production database 120 and made available through a data network by the server 130. Examples of devices used by users 102a-102f include, but are not limited to a desktop computer or portable electronic device such as a smartphone, a tablet, a laptop, a wearable device such as Google Glass®, another optical head-mounted display (OHMD) device, a smart watch, and so forth.

The content service 104 may support the creation, management, and release of content such as learning resources, and may facilitate communication among the users 102a-102e through any suitable combination of networks and interfaces. The content service 104 may handle and process data requests from users 102a-102e of system 100 related to management of learning resources and other content. For example, content users 102a and 102c can generate educational content objects using the integrated development environment 114 and have those additions/changes stored in the content database 116 (and/or released to the production database 128). In addition, changes may be synchronized with a remote content management system (e.g., Github®) using import/export features of the integrated development environment 114. In some implementations, the content service 104 facilitates the automatic release of hierarchical content objects using release objects. In some implementations, these release objects allow users to modify educational content, add educational content, edit and/or update educational content, update the version of a release object, preview educational content, and so forth.

An authorization service or the like may be used to determine who can build, preview, or publish content using the integrated development environment 114. Multiple modes of access to production content can exist, which can be based on private authorization or public authorization. In still other implementations, a secure asset service can be used to protect intellectual property, e.g., files, images, video, and other media. The APIs 112 can also be used to connect to an external content management system or repository such as Github® for importing/exporting data and metadata. Also or alternatively, a caching layer can be used for quick access to the content in the integrated development environment 114 and making automatic saves to changes to the content of the integrated development environment 114. In some implementations, access to the APIs 112 can be restricted to an appropriate set of users. For example, a user with permission to create new educational content objects would have access to the APIs 112, while a content user 102f may not.

In some implementations, a user of the enterprise learning system 124 may have two different authorization identities. This can allow multiple modes of access to educational content, which can be based on private authorization or public authorization. For example, one authorization identity can be a set of access credentials based on a profile of an identity platform, e.g., a single sign on platform, a social network platform, a CRM computing platform, etc. The other authorization identity can be a set of access credentials associated with the enterprise learning system 124 or the integrated development environment 114. In some implementations, the enterprise learning system 124 can query the set of access credentials from the identity platform and map those credentials and/or permissions with credentials associated with the enterprise learning system 124. In other implementations, authorization includes two levels of authorization, for instance, functional authorization and record authorization. Functional authorization can include access to one of the APIs 112 to manage the release of release objects, e.g., approval, incomplete, etc. Record authorization can include access to one or more portions of the educational content to be released, e.g., title, name, etc. Record authorization can also control which users can access the educational content on the enterprise learning system 124, e.g., public view and/or private view.

The integrated development environment 114 can include a variety of components to allow for the quick and easy creation of hierarchically arranged educational content objects. The educational content objects can be created declaratively, e.g., unit objects created based on pop up indicators for generating the next unit object in sequence, assessments like multiple choice question quizzes, and hands-on exercises. In addition, integrated development environment 114 can be configured to allow for secure asset integration to keep files, images, or video from being previewed by the public. Educational content objects in progress can be previewed using production web styles applied automatically. Moreover, all changes including those through a rich text editor can be automatically saved to a client side cache for quick access and manipulation.

While the foregoing description emphasizes the management of learning resources, it will be understood that the system 100 may also or instead be used to manage other content such as website content, social media content, commercial content, and so forth. This may include public content that is available to general users on the Internet, private content that is available to credentialed users of a private content delivery platform, or some combination of these. Thus, the system 100 may more generally include a server 130 such as a webserver or the like supporting user access to content over a network, e.g., by the content users 102f. The production database 120 may more generally include a database of web content such as web pages, video, images, text, and so forth that might be deployed to users over a network using a webserver, or any other content that might be shared or distributed over a data network. The production database 120 may thus include general web content along with any number of learning resources supporting use or understanding of the web content, along with recommendations and/or recommendation information. The content may also be managed using a content management platform such as the content service 104 described above. In one aspect, the server 130 may be configured to provide recommendations based on items displayed in user content.

In one aspect, the production database 120 may include user content 132 including items for presentation in a display of a user device over a network, e.g., in a page such as a web page. This may, for example, include any of the hosted content described herein, or any other content suitable for navigation and viewing by devices over a network. The production database 120 may also or instead include recommendation information 134. The recommendation information may, for example, include a group of recommendations for presentation as recommendations along with the hosted content, as well as any information useful for selecting one or more of the recommendations as potentially relevant to a user viewing items from the hosted content. In one aspect, this may include a probability distribution indicating, e.g., a discrete probability that a user will select each of a number of the recommendations when viewing the item(s) of hosted content. This may also include, e.g., feature vectors or other information useful for a quantitative assessment of similarity or the like in order to select one or more of the recommendations for presentation to a user along with an item of content. While the user content 132 and recommendation information 134 are depicted as residing on a single server, it will be understood that the user content 132 and recommendation information 134 may be hosted on separate servers, and/or distributed across multiple servers, in any suitable configuration consistent with access to the user content 132 over a data network and the selection and presentation of recommendations to accompany the display of user content 132 on user devices.

Figure 2:
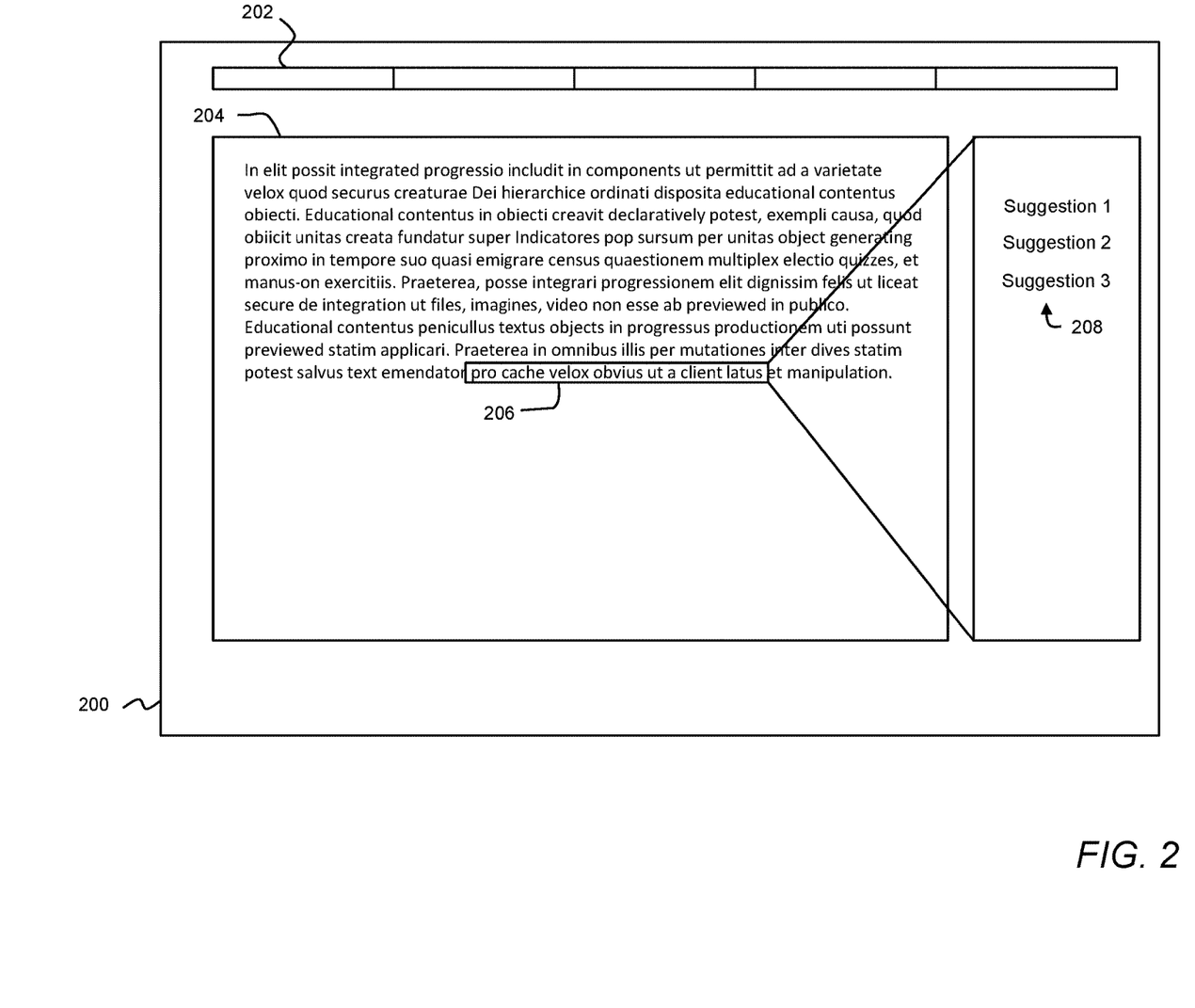
FIG. 2 illustrates a user interface for a web site.

FIG. 2 shows a user interface for a website. In general, the user interface 200 may provide a visual, interactive front for users to access content such as web content and the recommendations described herein. While the following description generally contemplates a user interface 200 for a website, it will be understood that other content delivery platforms and/or user interfaces 200 may also or instead be used to support access to content and learning resources as described herein. The user interface 200 may provide a number of controls 202 such as drop-down links, buttons, menus, and so forth for user navigation of, and interaction with, content, along with a window 204 showing text or other content for use by visitors to the website. This may include a private website, a public website, or some combination of these.

As described further herein, an item of content 206 may be presented to a user within the user interface 200. The item may be a page of content, or may be one or more elements of the page of content. For example, each item may include text, images, multimedia, an item in a list of items, a link to a file or other downloadable content, and so forth. The user interface may also present one or more recommendations 206, such as recommendations selected and ranked using the techniques described herein.

Figure 3:
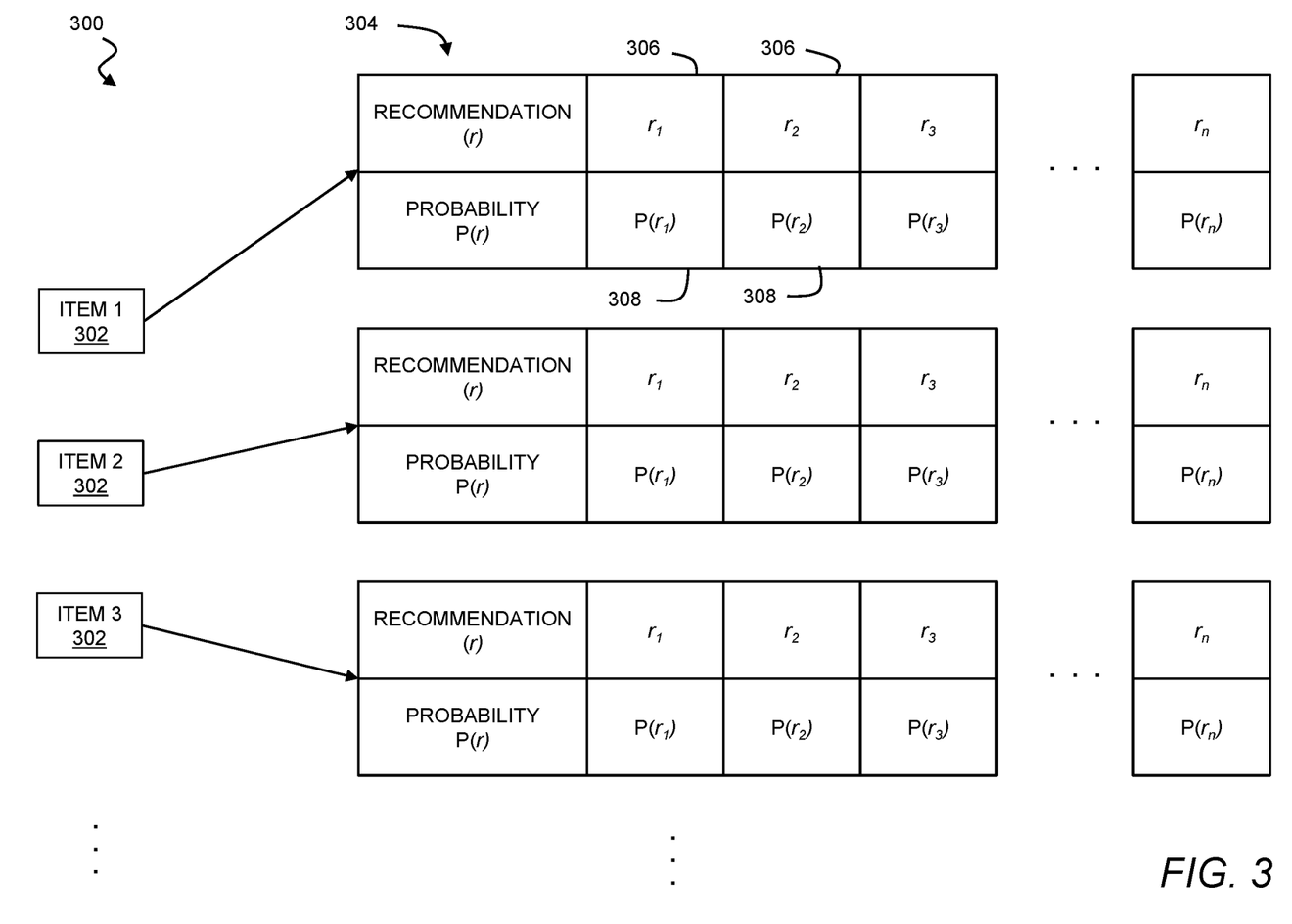
FIG. 3 illustrates a data structure used in a recommendation system.

FIG. 3 illustrates a data structure used in a recommendation system. In general, each item 302 may have an associated probability distribution 304 such as a discrete probability distribution that associates each recommendation 306 for the item 302 with a likelihood 308 that a user will select that recommendation 304 from among the recommendations 304 in the probability distribution when the user is viewing the item 302. The sum of probabilities for a distribution will typically equal one, although this convention is not required in order to generate ranked recommendations as described herein. The probability distributions 304 may be stored in a relational database or other data structure 300 that permits storage and retrieval of individual likelihoods 308 and probability distributions 304.

Figure 4:
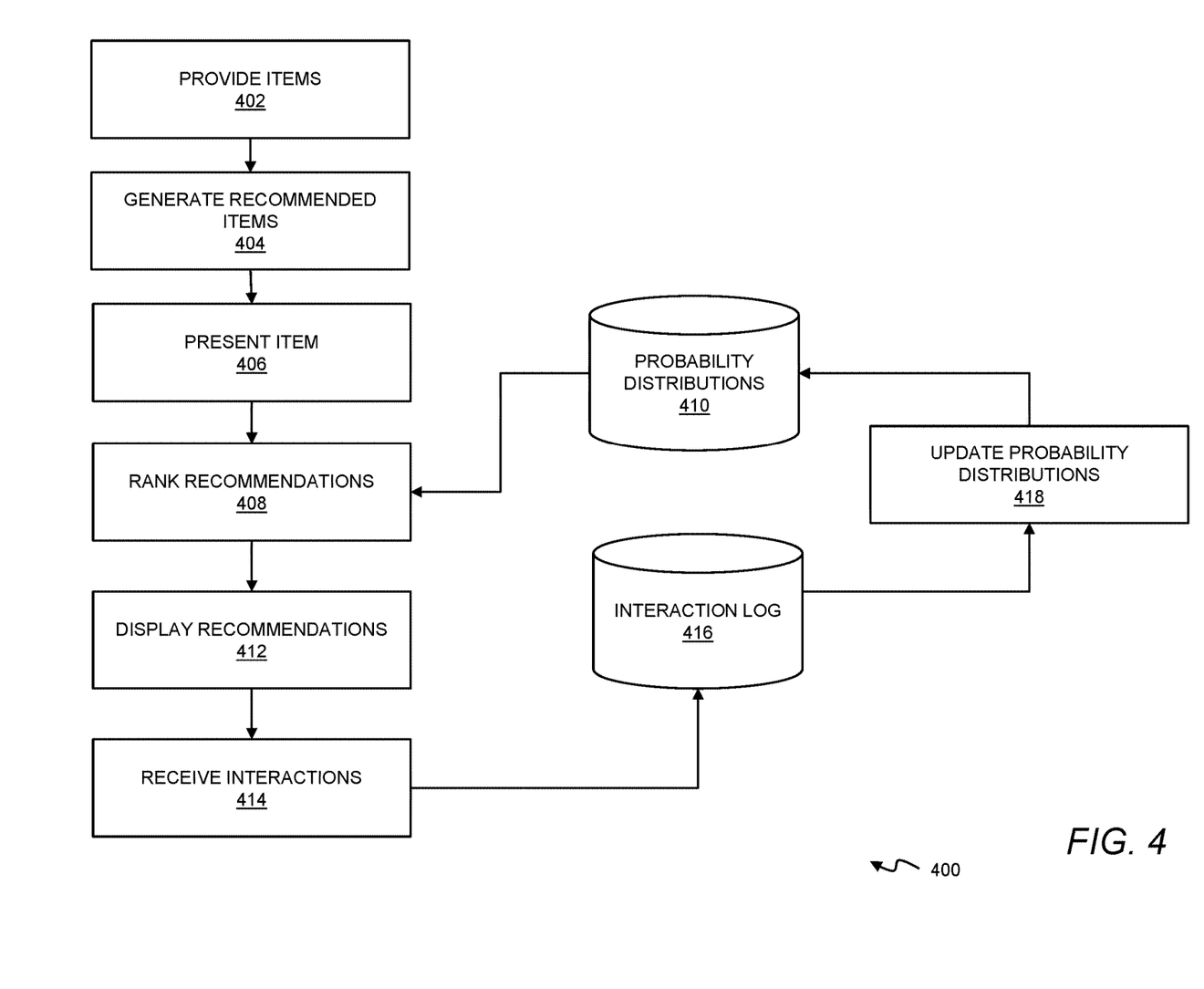
FIG. 4 a method for managing a list of recommendations.

FIG. 4 shows a method for managing a list of recommendations. In general, a probability distribution for recommendations, or more specifically, a discrete probability distribution of likelihoods of being selected based on a corresponding item displayed to a user (or selected by a user, or otherwise interacted with by the user), may be incrementally updated based on a stream of user interactions with a list of such recommendations that is published to users along with the corresponding item.

As shown in step 402, the method 400 may begin with providing items that might be displayed to users, either alone or in combination with other content. This may generally include web pages, web content, files, images, videos, audio media, web documents, and so forth, as well as combinations of the foregoing, or any other files, media, or other computing objects that might be shared with users over a data network. In one aspect, the item may be an item previously selected by the user, either as a recommendation, as an advertisement, as an item in a collection of search results, or selected from some other source or collection of results or recommendations. While the techniques described herein may be usefully applied to create data-driven recommendations in response to specific user interactions, the techniques may be particularly advantageous where the current context for the user—the item being presented— already carries a significant indication of user intent, such as a purposeful selection of the item from among other potential content of interest.

As shown in step 404, the method 400 may include generating recommended items related to or otherwise associated with each of the items provided in step 402. In one aspect, the method 400 for making recommendations may execute concurrently with one or more other recommenders for a web site or other content. These alternative recommenders may use any suitable techniques for creating and managing recommendations related to the item when displayed, e.g., in a page of web content. By way of example and not limitation, the recommender(s) may create recommendations based on similarity to web site content, online targeting techniques based on user context, keywords, cookies, query keywords, search results, and so forth. Thus, new recommended items may come from one or more other recommenders that generate individual recommendations or lists of recommendations for the web site, typically when a user clicks upon a recommendation from another recommender. Results from other recommenders may also or instead be used to bootstrap the system, e.g., to provide an initial set of recommendations for the method 400 described herein. Thus in one aspect, the method 400 may include adding a new recommended item to the recommended items based on a selection of the new recommended item when presented by an alternative recommender with the item.

While other recommenders may be run concurrently with the recommendation engine described herein, and used to generate new recommendations for ranking and display in the method 400 described herein, it will be understood that the initial recommendations, and/or changes to the set of initial recommended items, may also or instead be obtained from other sources. The set of recommended items may, for example, include a manually created group of recommended items, an automatically created group of items, or some combination of these. In general, this may include learning resources, goods or services, web content, advertisements, or any other items, descriptions of items, or links to items that might be of interest to a user viewing one of the items provided in step 402. The recommended items may be embodied in any suitable form or format for presentation in the user interface including, without limitation, links, documents, text, HTML content, downloadable objects, multimedia content, and so forth. The recommended items associated with a particular item as possible recommendations may be updated from time to time, either manually or automatically (e.g., based on feature similarity, responses to queries of other online resources, etc.), to add recommended items, remove recommended items, or generate a new list of recommended items. It will be understood that not all of the recommended items generated in this step will necessarily or likely be displayed to a user viewing an item. Instead, the recommended items may be ranked as described herein, and a group of the recommended items having a greatest likelihood of being selected by a user viewing the item may be selected for presentation to a user. Further the recommended items, or the candidate group of recommended items from which a list is selected for display, may be modified from time to time by periodically re-ranking recommended items, and/or adding or removing recommended items from the group of candidates and/or the list that is displayed to a user.

As shown in step 406, the method 400 may include presenting an item to a user, such as by presenting the item for viewing in a page of web content or the like, along with one or more recommended items, which may be selected and ranked as further described herein. Presenting the item may, for example, include presenting the item to a content user from a server, as described above. The item may be presented, e.g., in response to a user selection of a search result or a user selection from a list of items in a web page or the like.

As shown in step 408, the method 400 may include ranking recommended items for display in a user interface as recommendations associated with the item of content. A number of techniques may be used to rank the recommended items. In one aspect, ranking may include creating a probability distribution 410 such as a discrete probability distribution that includes, for each of the plurality of recommended items, a probability of being selected by a user viewing the item, and then ranking the recommended items according to the probability distribution 410.

In general, the probability distribution 410 may be iteratively updated in response to user interactions with various ones of the recommended items, e.g., as described below. In this manner, the probability distribution 410 can be continuously updated to reflect actual user selections from among the displayed recommended items. However, an initial ranking must be selected the first time that the recommended items are displayed. This initial ranking may be created in any of a number of ways. For example, the initial ranking may be based on probability distributions that were obtained for the recommended items in association with one or more other items similar to the item currently being presented. In another aspect, the initial ranking may be based on feature-based similarity measures between a group of candidate recommended items and the item being presented. Other techniques may also or instead be used, such as machine learning tools or the like. In another aspect, the initial rankings may be randomly assigned. While this will likely produce low-quality recommendations early, the ranking will be updated over a period of time based on user interactions, and will trend toward a ranking based on actual relevance to users, as inferred from user interactions as described herein.

As shown in step 412, the method 400 may include displaying the recommended items, such as by displaying the recommended items in a page according to the ranking described above.

As shown in step 414, the method 400 may include receiving an interaction with the recommended items. For example, this may include receiving an interaction, from a user viewing the page that includes the item and the number of recommended items, with a first item of the plurality of recommended items. In general, the interaction may be any interaction supported by the user interface for the page. For example, this may include a selection of one of the recommended items in the page. The interaction may also or instead include an addition of the recommended item to an online shopping cart, or a check-out for an online shopping cart containing the recommended item, or any other interaction indicative of user interest in one of the recommended items. While any interaction may be used as a basis for inferring user interest and updating the probability distribution 410, it will be understood that the preceding examples—selection, addition to a cart, and checking out a cart—are generally associated with strong user interest, and may be preferentially employed to adjust the probability distribution 410. This inference may be algorithmically realized by weighting different types of interactions differently, e.g., by weighting a user purchase of a recommended item (cart checkout) more heavily than an initial user selection of a recommended item. It will also be understood that certain interactions may also or instead be used to infer a lack of user interest in a particular recommendation. For example, where a preview feature is available in a browser, e.g., that permits a right click of a link to preview linked content, a user preview of a first recommended item, followed by a user selection of a second, different recommended item, may be used to infer that a user was not interested in the first item, and the probability distribution may be adjusted to specifically decrease a probability of selection for the first item.

Each user interaction may be stored in an interaction log 416 or other repository of click stream activity associated with the content generally, or a data repository associated with the presented item and the recommended items in particular. Each interaction may be stored using any format suitable for user interaction events such as click streams, and may include information such as the item, the selected recommended item, a date, a time, user information (if available) such as an IP address, user name, machine or device name, and so forth.

As shown in step 418, the method 400 may include adjusting the probability distribution based on user interactions with the recommended items. In general, this may include adjusting the probability to increase a likelihood of selection for the recommended item, and decreasing a likelihood of selection for other recommendations, e.g., proportionally to return a sum of the likelihoods in the probability distribution to one. This general approach advantageously avoids the computation complexity of time-dependent logic and feature-based similarity comparisons.

In one aspect, the probability distribution may be continuously updated with each new interaction. In another aspect, the probability distribution may be batch-updated using a group of interactions stored in an event log such as the interaction log. As a further advantage, this latter approach avoids the need for continuous processing and recalculation of probability distributions, which may be impractical or impossible for large-scale online systems. Instead, the probability distribution may be fixed over some interval, and interactions can be accumulated and then sequentially applied to update the probability distribution at the end of the interval. By choosing a suitable interval, e.g., once per hour, twice per day, once per day, or the like, the recommendations may be kept relevant to a current user without requiring continuous processing and updates to the probability distribution stored in the production database for use by the server 130. Thus, in one aspect, adjusting the probability of being selected for each of the recommended items in the probability distribution may include updating the probability distribution at periodic intervals on a batch basis by sequentially recalculating the probability distribution for each of a group of selection activities accumulated in an event log such as the interaction log.

While the probability distribution may be adjusted based on interactions with recommended items in the probability distribution, it will be understood that updates may also or instead be based on other information. For example, adjusting the probability distribution may include, in response to an interaction with one of the recommended items, adjusting one or more other probability distributions for one or more other recommended items related to one or more other pages. Thus, where relevant inferences can be drawn about other probability distributions, e.g., for closely related anchor items and/or closely related lists of recommended items, this information may be used to correspondingly update related probability distributions, e.g., by adding the interaction and any related information, to the event log for any such other probability distributions. Where appropriate, the interaction or its effect on the other probability distributions may be weighted to reflect the secondary nature of the inference. Similarly, adjusting the probability distribution may include adjusting the probability distribution for each of a number of different types of interactions using a type-specific ranking parameter for each type. Thus for example, the update may use different ranking parameters for different types of interactions such as a selection of the recommended item, an addition of the recommended item to an online shopping cart, or a check out for an online shopping cart containing the recommended item.

Once the probability distribution has been updated, the updated probability distribution may be saved as a probability distribution 410 for use in ranking recommendations to be presented with an item of content as described in step 408.

Without limiting the generality of this disclosure, a more detailed algorithm suitable for use in adjusting the probability distribution is now described.

Figure 5:
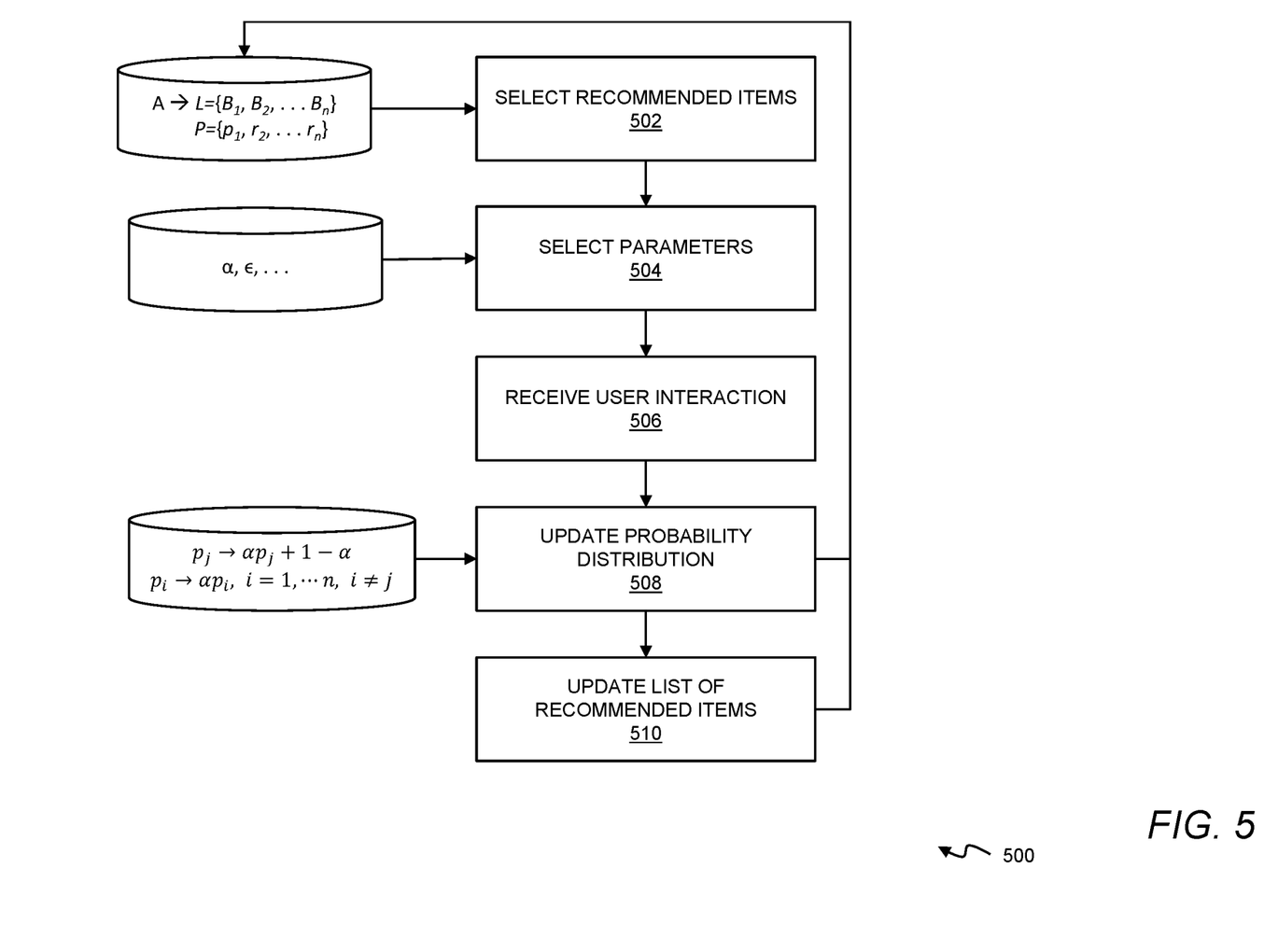
FIG. 5 shows a method for updating a probability distribution for recommended items.

FIG. 5 shows a method for updating a probability distribution for recommended items that can be used to rank items as described herein. In general, the method 500 is based on a categorical distribution:

$$P=\{p_1, p_2 \ldots, p_m\} \quad [\text{Eq. 1}]$$

that corresponds to a list of recommended items $$A \rightarrow L=\{B_1, B_2, \ldots, B_m\} \quad [\text{Eq. 2}]$$

A click on a recommendation $B_i$ in the list of recommended items can be represented by a delta function distribution:

$$\delta_i=(0, \ldots, 1, \ldots, 0) \quad [\text{Eq. 3}]$$

on a set of indexes $\{1, \ldots, m\}$ that has all its mass values equal to 0 except the one with index i. Such a click may be used to trigger a convex mixture update of the probability distribution P according to a ranking parameter $\alpha$ using the rule:

$$P \rightarrow \alpha P + (1-\alpha)\delta_i, 0 < \alpha < 1 \quad [\text{Eq. 4}]$$

In this manner, a click on a recommendation $B_i$ may reduce a rank of other page recommendations, while tilting the probability distribution towards a recommendation of the item $B_i$.

In general, the method 500 may begin with an existing set of probabilities, e.g., the probability of recommendation clicks on products $B_i$ when a user has clicked on a recommendation corresponding to an anchor item A. The recommended items $B_1, B_2, \ldots B_n$ for A (the anchor item, or simply, the 'item') may be ranked for relevance as $r_1, r_2, \ldots r_n$. The probability distribution may be initially expressed as:

$$q_i = \mathbb{P}(B_i | \text{recommendation click on page } A), i=1, \ldots, m \quad [\text{Eq. 5}]$$

where an initial set of ranks $r_i$ can optionally be used as an initial estimate of the probability distribution [Eq. 1] since the list of ranks can be turned into a list of probabilities $Q'=\{q'_1, q'_2 \ldots, q'_m\}$, using a formula such as:

$$q'_i = r_i \Big/ \sum_{j=1}^{n} r_j \quad [\text{Eq. 6}]$$

or using any other suitable formula or rules. Initially, the probabilities $q_i$ need not be known or accurately estimated if the algorithm for updating the probabilities converges on a useful result relatively quickly. Using these principles, the following method 500 may be applied to update a probability distribution for making recommendations related to an item A.

As shown in step 502, the method 500 may begin with selecting recommended items, e.g., using any of the techniques described above for generating recommended items, or any other technique or combination of techniques for obtaining a list of recommended items and a corresponding probability distribution.

As shown in step 504, the method 500 may include selecting parameters such as a ranking parameter $\alpha$ and a threshold $\varepsilon$. The ranking parameter may have a value between zero and one that controls sensitivity of the update to new selections. Using the formula provided below, the ranking parameter will typically have a value close to one (e.g., a value between nine tenths and one) in order to avoid aging unselected items too quickly, although other values of the ranking parameter and other formulas may be used. The threshold may provide a floor for probability of recommendations, below which a recommended item may be removed from the list of recommended items. Typically, although not necessarily, this will be a relatively small number such as 0.01 or 0.001, or some other number that removes a recommended item from the list of recommended items when the recommended item is believed to be highly unlikely to be selected in the future. In general, the selection of parameter values may be manual, automatic, or some combination of these. For example, a content administrator may be provided with general categories of sensitivity to new selections such as low, medium, and high, and the system may automatically select a ranking parameter to control the impact of new user interactions. In another aspect, the user may specify a preferred duration of highly ranked recommendations, which may depend on the type of recommendation, the anchor item A, or some other aspect(s) of user context, and the system may calculate a ranking parameter that provides a suitable time constant for the duration of recommendations.

As shown in step 506, a user interaction may be received. In general, this may include any of the user interactions described herein including. While this may include an interaction with the anchor item A, it will be understood that this may also or instead include interactions with other items (e.g., related to the anchor item A) and/or other lists of recommended items (e.g., including recommendations for other items related to the anchor item A), particularly where such interactions can provide useful inferences about the current list of recommended items.

As shown in step 508, the probability distribution may be updated based on the interaction. For example, for a selection $B_1$ of recommended items $B_1, B_2, \ldots B_n$, the probability distribution P may be updated using the rule:

$$p_j \rightarrow \alpha p_j + 1 - \alpha, \text{ and} \quad [\text{Eq. 7}]$$

$$p_i \rightarrow \alpha p_i, i=1, \ldots n, i \neq j \quad [\text{Eq. 8}]$$

As a significant advantage, this pair of rules increases the likelihood of being selected for the item that was selected, and correspondingly decreases the likelihood of being selected for other recommended items in the list using a compact, computationally simple algorithm with no time-dependent logic or calculations. It will, however, be understood, that other techniques for incrementally updating such a probability distribution based on a single interaction or group of interactions may also or instead be used without departing from the scope of this disclosure.

In this model, the ranking parameter α has a number of properties of note. In general, decreasing the ranking parameter α gives higher priority to recent click recommendation events, and therefore, sensitivity of the ranking algorithm to new recommendation interactions can be controlled, e.g., at runtime, by adjusting a single parameter. The ranking parameter may be used in this manner to more specifically control the half-life of recommended items. For example, in order for an item to lose half of its probability over t updates to a list of recommended items, this can be explicitly achieved by setting the ranking parameter α to:

$$\alpha = e^{\frac{-\log(2)}{t}} \quad (2)$$

Thus, for example, if t=10 then α≈0.93. More generally, an unpopular or idle recommended item will lose its rank-probability at an exponential rate $\alpha^t$ for any t interactions that exclude the recommended item.

It will also be noted that when a recommended item is selected, the likelihood of being selected p for that recommended item is scaled up by a multiplier:

$$\alpha + p^{-1}(1-\alpha) > 1 \quad \text{[Eq. 10]}$$

with magnitude that is inversely related to its probability. Therefore, a relative after-click boost for a low-ranked recommended item is higher than the after-click boost for a popular one or, in other words, the algorithm tends to increase visibility for unpopular items after they have been selected (or otherwise interacted with). Thus, both the idleness decay [Eq. 9] and the activity boost [Eq. 10] described above may be controlled by a single ranking parameter α.

As noted above, the probability distribution may be updated with each new interaction (e.g., in real time or near real time), or the probability distribution may be updated in a batch process based on an event log or interaction log that stores a collection of interactions with recommended items over some interval of time. The updated probability distribution may be stored along with the list of recommended items for use the next time a selection of recommended items is made for presentation to a user viewing the anchor item A.

According to the foregoing, a ranking parameter may generally be used to control the sensitivity of the overall probability distribution to each incremental new selection of a recommended item. Thus in one aspect, the method 500 may more specifically include, in response to an interaction, adjusting the probability of being selected for each of the plurality of recommended items in the probability distribution by increasing the probability of being selected for the first item of the plurality of recommended items (e.g., according to a ranking parameter) and decreasing the probability of being selected for at least a second item of the plurality of recommended items (e.g., according to the ranking parameter). For this incremental adjustment, decreasing the probability of being selected for each other one of the plurality of recommended items may include multiplying the probability of being selected for each other one of the plurality of recommended items by the ranking parameter to proportionally decrease the value thereof. Similarly, increasing the probability of being selected for the one of the plurality of recommended items may include multiplying the probability of being selected for the one of the plurality of recommended items by a function of the ranking parameter that causes a sum of probabilities in the probability distribution to equal one, such as the multiplier shown in [Eq. 10].

The ranking parameter may be adjusted to control sensitivity of the probability distribution to new user interactions, e.g., by controlling the rate of decay for the likelihood of selection for unselected items within the probability distribution in response to each new user interaction. In one aspect, the ranking parameter may be dynamically adjusted such that each probability of an unselected item decreases a predetermined amount over a predetermined interval, e.g., based on a history of interactions stored in the interaction log or event log. Thus, in one aspect, the method 500 may include dynamically adjusting the ranking parameter to reduce the probability of any of the plurality of recommended items that remains unselected over a predetermined interval by a predetermined amount based on an average per-item click rate for historical activity. This may usefully assist an administrator in making time-based decisions (e.g., the likelihood should decrease by one half in one day), while permitting the system to monitor numerical click rates and adjust the ranking parameter accordingly.

As shown in step 510, the list of recommended items may be updated. While the probability distribution may usefully update as described above, it will be understood that recommended items may also be added to or removed from the list of recommended items under various conditions.

In one aspect, a new recommended item may be added to the list of recommended items. For example, multiple recommenders may be running for a website and may display recommended items to users at various times. When the number of recommended items falls below a predetermined threshold or when an existing recommended item falls below a threshold for likelihood of selection, a new recommended item may be provided from an alternative recommender that provides recommendations related to the anchor item. Similarly, when a recommended item from another recommender is selected by a user, that new recommended item may automatically be added to the list of recommended items, either by replacing a low-ranked item in the list of recommended items or by increasing number of items in the list of recommended items.

In another aspect, when the number of recommended items falls below some predetermined threshold, a new recommended item may be randomly selected from a pool of items, selected by a human, automatically selected from a human-curated list, selected based on a similarity analysis (e.g., relative to the anchor item A or items in the current list of recommended items), or using any other suitable technique. The new recommended item may be assigned a probability based on the ranking parameter α using a formula such as:

$$p = 1 - \alpha \quad \text{[Eq. 11]}$$

with corresponding adjustments to other probabilities in the distribution as necessary to return a sum of likelihoods in the probability distribution to one. Other techniques may also or instead be used. For example, the new recommended item may be assigned a probability to place the new recommended item at or near the bottom of the rankings in list of recommended items. In another aspect, the new recommended item may be assigned a probability by computing a max-entropy mixture distribution where an unbiased convex mixture of the existing recommendations (with a zero pad corresponding to the new recommendation) and the new recommendation (represented as a delta function with a single value at the same location as the zero pad in the existing recommendation) yield a mixing parameter that can be used as the ranking parameter:

$$\alpha = \frac{e^H}{1+e^H} \quad [\text{Eq. 12}]$$

(where −H is the entropy of P) when updating the probability distribution for the new recommendation. Stated differently, the new recommended item may be ranked within the probability distribution using a second ranking parameter that maximizes a mixture entropy of a convex mixture of a first distribution corresponding to the probability distribution padded with a zero and a second distribution containing a one padded with a zero for each other value in the probability distribution. This latter approach, while requiring some additional calculation, appears to provide a good strategy for addition of the new recommended item to the current list of recommended items.

In another aspect, a recommended item may be removed from the list of recommended items. For example, when a likelihood of selection for one of the recommended items falls below a threshold E, the recommended item may be removed from the list. In general, the threshold E may be a small value (e.g., 0.01, or 0.001) so that recommended items with a very small likelihood of being chosen are systematically removed. The threshold E may be a user-selected constant based on, e.g., an empirical observation of the number of recommended items that remain in the list over time for a given value of E, or may be calculated or selected based on a history of probability distributions or some other user context or the like. In general, when one item is removed, the remaining items may be re-scaled to retain a desired sum (such as one) for the probability distribution.

According to the foregoing, in one aspect there is disclosed herein a system including a server, a database, and a ranking engine. The server may be configured to present web content. The database may store content including an item for presentation by the server in a page, a plurality of recommended items related to the item, and a probability distribution that includes, for each of the plurality of recommended items, a probability of being selected by a user viewing the item. The ranking engine may be configured, e.g., by computer executable code, to receive an interaction by a user with one of the plurality of recommended items within the page and, in response to the interaction, to adjust the probability of being selected for each of the plurality of recommended items in the probability distribution by increasing the probability of being selected for the one of the plurality of recommended items according to a ranking parameter and to decrease the probability of being selected for each other one of the plurality of recommended items proportionally to adjust a sum of the probability of being selected for all of the recommended items in the probability distribution to one, wherein the server is configured to present a list of the plurality of recommended items in an order ranked according to the probability distribution.

Figure 6:
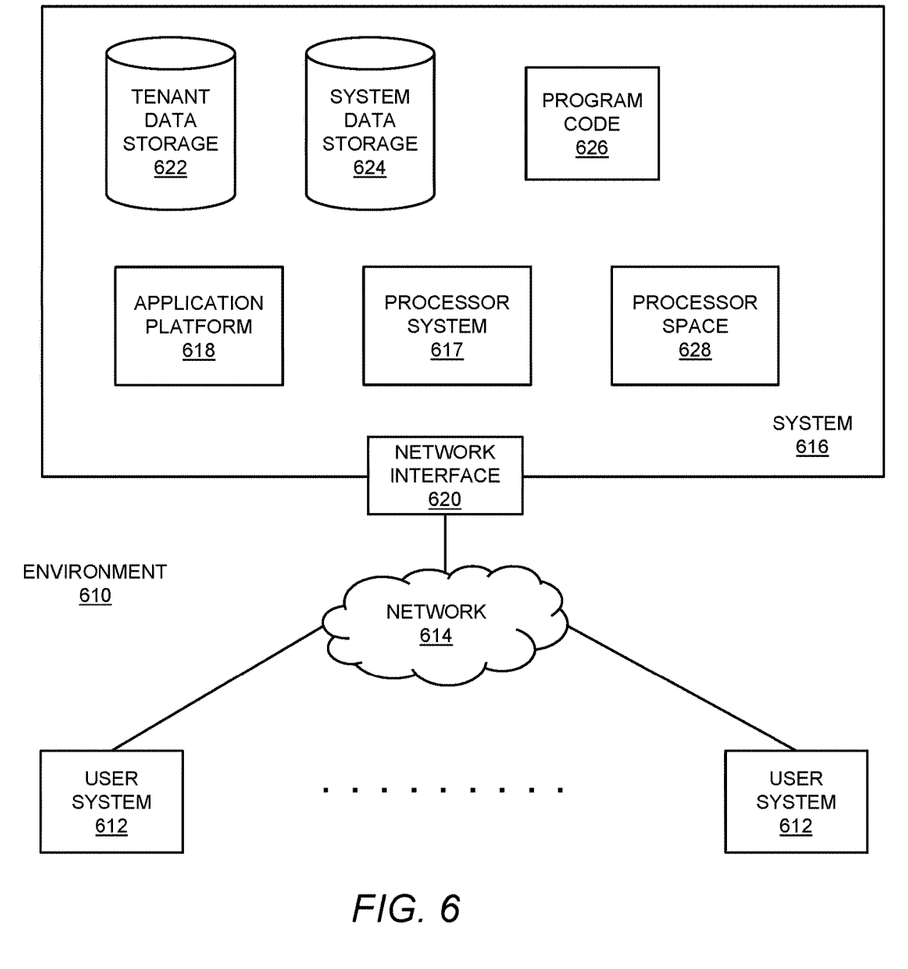
FIG. 6 illustrates a block diagram of an example of an environment wherein an on-demand database service might be used.

FIG. 6 illustrates a block diagram of environment 610 of an on-demand database service. While environment 610 illustrates an on-demand database service, the one or more implementations and techniques described herein are not limited to environment 610. For instance, embodiments may be implemented on other computing systems such as laptop, a tablet, a PDA, a desktop computer, a mobile device, a network system such as a LAN, a WAN, etc. Embodiments may also be practiced in other ways without departing from the scope of the embodiments.

Returning to FIG. 6, environment 610 may include one or more user devices 612, network 614, on-demand database service (ODDBS) 616, processor system 617, application platform 618, network interface 620, tenant data storage 622, system data storage 624 for system data 625 accessible by ODDBS 616, program code 626 for implementing various functions of ODDBS 616, and process space 628. In some embodiments, environment 610 may have other or different elements in addition to those listed above. In some embodiments, two or more of the elements discussed with respect to environment 610 may be combined into a single element. In some embodiments, one or more of the elements may be split into two or more separate elements within environment 610.

Figure 7:
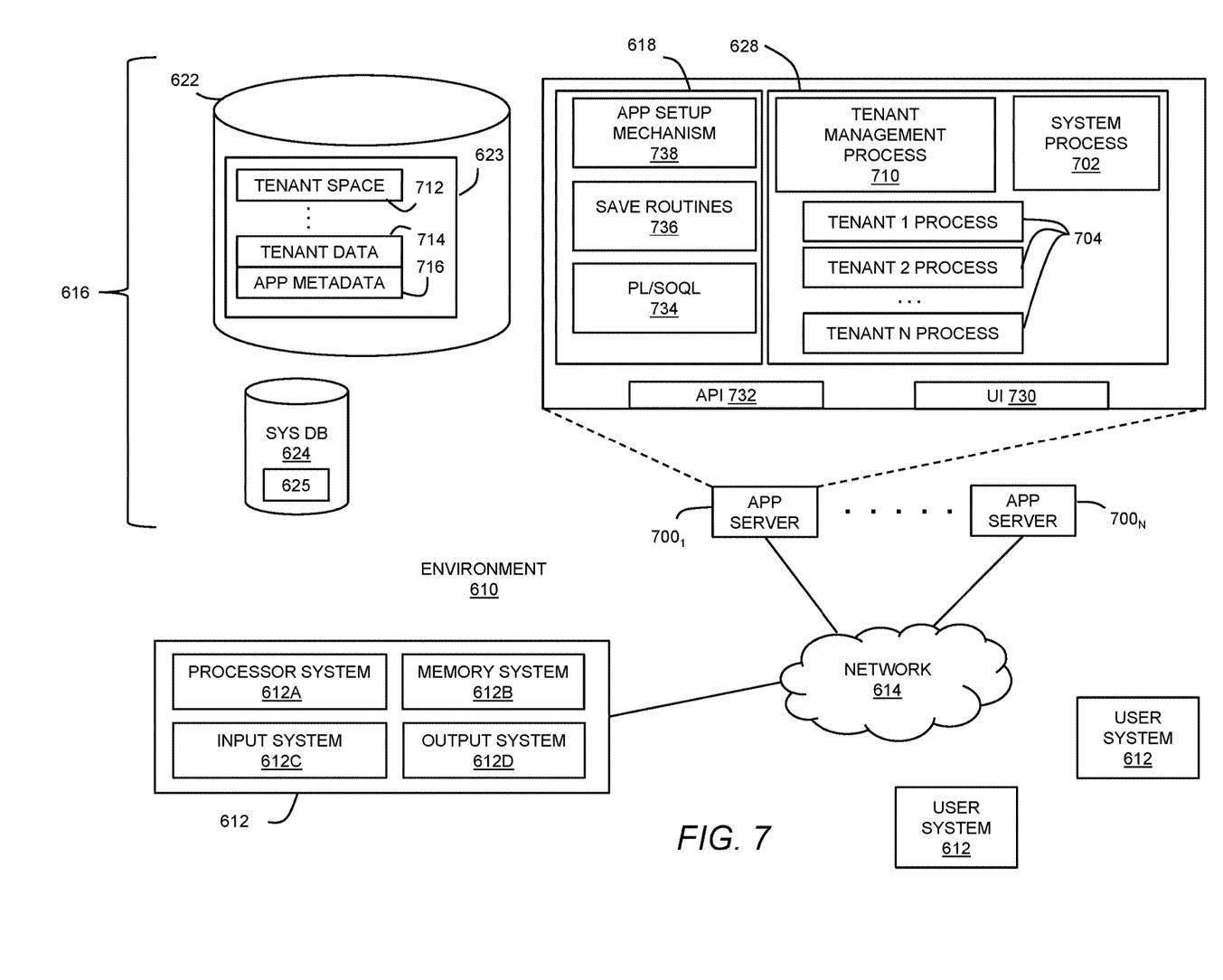
FIG. 7 illustrates a block diagram of an embodiment of elements of FIG. 6 and various possible interconnections between these elements.

User device 612 may be any machine or system used to access a database server. User device 612 can include a handheld computing device, a mobile phone, a laptop computer, a workstation, and a network of computing devices. An ODDBS 616 may be available for outside users when they need the database system. As illustrated in FIG. 6 and FIG. 7, user device 612 may interact via network 614 with ODDBS 616.

In some embodiments, ODDBS 616 may store information from one or more tenants in tables of a common database to form a multi-tenant database system (MTS). A relational database management system (RDMS) or the equivalent may execute storage and retrieval of information against the database object(s) stored in the database. Application platform 618 is a framework that enables ODDBS 616 providers, user device 612 users, or third party application developers to create, manage or execute one or more applications on the ODDBS 616

Administrators of the ODDBS 616 may determine different permission levels for users of user devices 612 based on roles and privileges. For example, a salesperson using a particular user device 612 to interact with ODDBS 616 has the capacities allotted to that salesperson. An administrator using user device 612 to interact with ODDBS 616 has the capacities allotted to that administrator.

Network 614 is any network or combination of networks of devices that communicate with one another. For example, network 614 can be any one or any combination of a LAN, WAN, telephone network, wireless network, or other configurations. A TCP/IP network is an example network system that implements embodiments. Some implementations might use protocols other than TCP/IP, such as a UDP, IPX/SPX, AppleTalk, ICMP, etc.

User devices 612 may communicate with ODDBS 616 using application protocols such as HTTP. User device 612 may run a browser, such as an HTTP client, enabling a user to access, process and view information, pages, and applications via network 614. For example, the browser can be used to access data and applications hosted by ODDBS 616, and to perform searches on stored data, and otherwise allow a user to interact with various GUIs. In other embodiments, native applications operating on user devices 612 may be used as user interfaces to the ODDBS 616.

In one embodiment, ODDBS 616 implements a customer relationship management (CRM) system that includes application servers configured to implement CRM software applications. An MTS may store data for multiple tenants in the same physical database. However, data of different tenant typically are logically separate so that one tenant does not have access to another tenant's data, unless such data are expressly shared. In certain embodiments, ODDBS 616 implements applications other than a CRM application. Additional processes that may execute on ODDBS 616 include database indexing processes.

User device 612 and all of its components may be operator configurable using applications running on a CPU. Similarly, ODDBS 616, all of its components, and additional instances of an MTS might be operator configurable using applications executed by processor system 617. A computer program product embodiment includes a machine-readable storage medium having instructions stored thereon/in that can be used to program a computer to perform any of the embodiments' processes. Computer code for implementing embodiments in any programming language such as Java™, Apex®, C++, etc.

In an embodiment, the ODDBS 616 is configured to provide webpages, forms, applications, data and media content to user system 612 to support access by tenants of ODDBS 616. As such, ODDBS 616 provides security mechanisms to keep each tenant's data separate unless the data are shared. If more than one server within the ODDBS 616 is used, those servers may be in close proximity or distributed across geographical locations. As used herein, each MTS can include one or more logically and/or physically connected servers distributed locally or across one or more geographic locations. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 further illustrates elements of system 610. User device 612 may include processor system 612A, memory system 612B, input system 612C, and output system 612D. ODDBS 616 may include tenant data storage 622, tenant data 623, system data storage 624, system data 625, User Interface (UI) 730, Application Program Interface (API) 732, PL/SOQL 734, save routines 736, application setup mechanism 738, applications servers 1000₁-1000N, system process space 702, tenant process spaces 704, tenant management process space 710, tenant storage area 712, user storage 714, and application metadata 716. In other embodiments, ODDBS 616 and/or user device 612 may not have the same elements as those listed above and/or may have other elements instead of, or in addition to, those listed above.

In FIG. 7, ODDBS 616 may include application servers 700. System process space 702 includes individual tenant process spaces 704 and a tenant management process space 710. The tenant data 623 might be divided into individual tenant storage areas 712, which can be either a physical arrangement or a logical arrangement of data. A UI 730 provides a user interface and an API 732 provides application programming interface to users and developers at user devices 612.

Application platform 618 includes an application setup mechanism 738 that supports application developers' creation and management of applications. Applications may be saved as metadata into tenant data storage 622 by save routines 736 for execution by subscribers as one or more tenant process spaces 704 managed by tenant management process 710. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations of applications may be detected by one or more system processes 702, which manage retrieving application metadata 716 for the subscriber making the invocation and executing the metadata as an application.

Application servers 700 may communicate with database systems via different network connections such as the Internet, direct network links. TCP/IP is the typical protocol for communicating between application servers 700 and the database systems. However, other transfer protocols, such as those mentioned above, may be used to optimize the network connection.

In certain embodiments, each application server 700 is configured to handle requests for any user associated with any organization that is a tenant. Preferably, a user or an organization has no server affinity for a specific application server 700i. In one embodiment, a load balancer is communicably coupled between the application servers 700 and the user devices 612. In this manner, ODDBS 616 is multi-tenant and handles storage of, and access to, different objects, data and applications across disparate users and organizations.

As an example of the use of ODDBS 616, one tenant might be a company that employs a sales force where each salesperson uses ODDBS 616 to manage their sales process. A user might maintain contact data, leads data, customer follow-up data, performance data, goals and progress data, etc., in tenant data storage 622. In an MTS arrangement, the user can manage his or her sales efforts and cycles from any of many different user systems.

While each user's data might be separate from other users' data, some data might be organization-wide and is shared or accessible by a plurality of users. Thus, some data in ODDBS 616 are managed at the tenant level while other data are managed at the user level. The MTS has security protocols that keep data, applications, and application use separate. ODDBS 616 might also maintain system level data usable by multiple tenants or other data, such as industry reports, news, and postings sharable among tenants. Also, the MTS can implement redundancy, up-time, and backup functions.

In certain embodiments, user devices 612 communicate with application servers 700 to request and update system-level and tenant-level data from ODDBS 616 that may require sending one or more queries. ODDBS 616 automatically generates the one or more SQL queries designed to access the requested data in the database.

Each database can generally be viewed as a collection of objects, such as a set of logical tables, containing data fitted into predefined categories. A "table" is one representation of a data object, and may be used herein to simplify the conceptual description of objects and custom objects. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. "Table," "object," and "entity" may be used interchangeably herein.

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

While one or more implementations and techniques are described with reference to an embodiment in which discovery and recommendation of online learning resources is implemented in a system providing a front end for an on-demand database service capable of supporting multiple tenants, the one or more implementations and techniques are not limited to multi-tenant databases. For instance, embodiments may be implemented on other computing systems such as laptop, a tablet, a PDA, a workstation, a mobile device, a network system such as a LAN, a WAN, etc. Embodiments may also be practiced using database architectures, such as ORACLE®, DB2® by IBM and the like without departing from the scope of the embodiments. The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the present teachings as defined by the following claims, which are to be interpreted in the broadest sense allowable by law.

What is claimed is:

1. A computer-implemented method for revising a ranked list of recommendations, the method comprising:
generating a plurality of recommended items related to an item;
characterizing the plurality of recommended items with a probability distribution that includes, for each of the plurality of recommended items, a probability of being selected by a user viewing the item;
ranking the plurality of recommended items according to the probability distribution;
displaying the plurality of recommended items in a page according to the ranking;
receiving an interaction with a first item of the plurality of recommended items; and
in response to the interaction, adjusting, by a processor, the probability of being selected for each of the plurality of recommended items in the probability distribution by:

increasing the probability of being selected for the first
item of the plurality of recommended items including
multiplying the probability of being selected for the
first item by a function of a ranking parameter that
causes a sum of probabilities in the probability distribution to equal one; and decreasing the probability of being selected for at least a
second item of the plurality of recommended items
including multiplying the probability of being selected
for at least the second item by the ranking parameter.

2. The method of claim 1 wherein adjusting the probability of being selected for each of the plurality of recommended items in the probability distribution includes increasing the probability of being selected for the first item of the plurality of recommended items according to a ranking parameter and decreasing the probability of being selected for at least a second item of the plurality of recommended items according to the ranking parameter.

3. The method of claim 2 wherein the ranking parameter has a value between zero and one.

4. The method of claim 2 wherein the ranking parameter has a value between nine tenths and one.

5. The method of claim 2 further comprising dynamically adjusting the ranking parameter to reduce the probability of any of the plurality of recommended items that remains unselected over a predetermined interval by a predetermined amount based on an average per-item click rate for historical activity.

6. The method of claim 1 wherein the interaction includes a selection of the one of the plurality of recommended items in the page.

7. The method of claim 1 wherein the interaction includes an addition of the one of the plurality of recommended items to an online shopping cart.

8. The method of claim 1 wherein the interaction includes a check-out for an online shopping cart containing the one of the plurality of recommended items.

9. The method of claim 1 wherein the recommended items include at least one product, service, multimedia object, or learning resource related to content within the page.

10. The method of claim 1 further comprising removing a first one of the recommended items when the first one of the recommended items has a first probability of being selected less than a predetermined threshold.

11. The method of claim 1 further comprising adding a third recommended item to the recommended items based on a selection of the third recommended item when presented by an alternative recommender with the item.

12. The method of claim 11 wherein the third recommended item is ranked at a bottom of the plurality of recommended items.

13. The method of claim 11 wherein the third recommended item is ranked within the probability distribution using a ranking parameter that maximizes a mixture entropy of a convex mixture of a first distribution corresponding to the probability distribution padded with a zero and a second distribution containing a one padded with a zero for each value in the probability distribution.

14. The method of claim 1 further comprising presenting the item for viewing in the page along with one or more of the plurality of recommended items.

15. The method of claim 1 wherein adjusting the probability of being selected for each of the plurality of recommended items in the probability distribution includes updating the probability distribution at periodic intervals on a batch basis by sequentially recalculating the probability distribution for each of a group of selection activities accumulated in an event log.

16. The method of claim 1 further comprising, in response to the interaction, adjusting one or more other probability distributions for one or more other recommended items related to one or more other pages.

17. The method of claim 1 further comprising adjusting the probability distribution for each of a plurality of different types of interactions using a type-specific ranking parameter for two or more of a selection, an addition to an online shopping cart, and a check out for the online shopping cart.

18. A computer program product for revising a ranked list of recommendations comprising non-transitory computer executable code embodied in a computer readable medium that, when executing on one or more computing devices, performs the steps of:
generating a plurality of recommended items related to an item;
characterizing the plurality of recommended items with a probability distribution that includes, for each of the plurality of recommended items, a probability of being selected by a user;
ranking the plurality of recommended items according to the probability distribution;
displaying the plurality of recommended items in a page according to the ranking;
receiving an interaction with a first item of the plurality of recommended items; and
in response to the interaction, adjusting the probability of being selected for each of the plurality of recommended items in the probability distribution by:
increasing the probability of being selected for the first item of the plurality of recommended items including multiplying the probability of being selected for the first item by a function of a ranking parameter that causes a sum of probabilities in the probability distribution to equal one; and
decreasing the probability of being selected for at least a second item of the plurality of recommended items including multiplying the probability of being selected for at least the second item by the ranking parameter.

19. A system comprising:
a server configured to present web content;
a database storing content including an item for presentation by the server in a page, a plurality of recommended items related to the item, and a probability distribution that includes, for each of the plurality of recommended items, a probability of being selected by a user viewing the item; and
a ranking engine configured to receive an interaction by a user with one of the plurality of recommended items within the page and, in response to the interaction, to adjust the probability of being selected for each of the plurality of recommended items in the probability distribution by:
increasing the probability of being selected for the one of the plurality of recommended items including multiplying the probability of being selected for the first item by a function of a ranking parameter that causes a sum of probabilities in the probability distribution to equal one; and
decreasing the probability of being selected for at least a second item of the plurality of recommended items including multiplying the probability of being selected for at least the second item by the ranking parameter,
wherein the server is configured to present a list of the plurality of recommended items in an order ranked according to the probability distribution.

* * * * *